United States Patent Office 3,520,443
Patented July 14, 1970

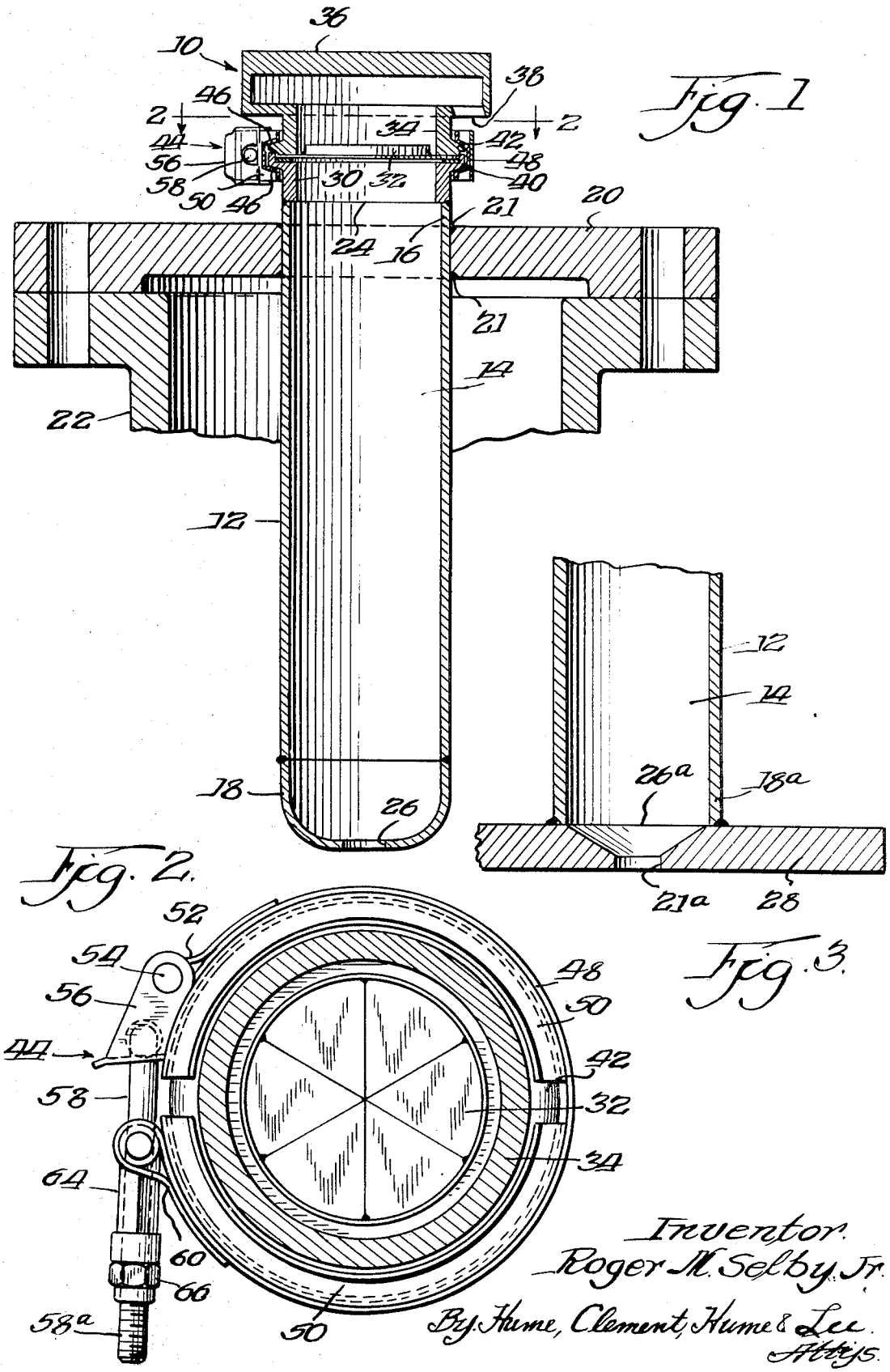

3,520,443
SAFETY VENT STRUCTURE
Roger M. Selby, Jr., Munster, Ind., assignor to Union Tank Car Company, Chicago, Ill., a corporation of Delaware
Filed June 4, 1968, Ser. No. 734,489
Int. Cl. B65d 25/100
U.S. Cl. 220—89  6 Claims

ABSTRACT OF THE DISCLOSURE

A safety vent structure for pressure vessels. A body defines a chamber having first and second openings, the latter communicating with a third opening in the vessel. Associated with the first opening is a seat member adapted to receive a frangible element in closing relationship to the first opening. A retainer member, which may include a cover, serves to hold the frangible element against the seat. Both the seat and the retainer have beveled projections around the outer peripheries thereof. A clamp having inner bearing surfaces is secured about the peripheries of the seat and retainer so that the bearing surfaces will urge the projections together when the clamp is tightened. The body may project partially through the third opening in the vessel wall, so that the second opening is within the vessel itself. Either the second or third openings may have a sectional area which is less than the sectional area of the chamber, so as to retard transient pressure buildup within the chamber.

BACKGROUND—SUMMARY—DRAWINGS

This invention relates to safety vents for vessels and, in particular, to an improved safety vent structure embodying a pressure-responsive frangible element. Although the invention will be described in the environmental context of a railway tank car, it should be understood that it may be advantageously employed in connection with many other types of fluid storage or transport vessels.

A fluid being transported in a railway tank car, as for example a volatile liquid, may under certain conditions create a pressure within the tank that exceeds a maximum permissible level dictated by the design characteristics of the tank and the materials from which it is formed. Accordingly, it has long been the practice to provide safety vents which automatically vent the tank to atmosphere when this maximum permissible pressure level is reached, thus preventing tank damage or failure. One common type of safety vent designed for this purpose has involved the use of a frangible element, such as a thin lead disc, one side of which is in fluid communication with the interior of the tank and the other side of which is in fluid communication with the atmosphere. Thus, when the pressure within the tank reaches the maximum permissible level, the frangible element ruptures, allowing fluid within the tank to escape to atmosphere and thus reducing the tank pressure.

In such devices, it is sometimes necessary to replace the frangible element, and often necessary to expose it for damage inspection, cleaning, and the like. Numerous vent structures have been employed in the prior art. In some of these the frangible element is fairly readily accessible for inspection or replacement, but such designs have been quite complicated and expensive. Other designs, on the other hand, have been relatively simple and inexpensive, but have made inspection or replacement of the frangible element quite difficult and time-consuming. An example of the former type of prior art vent structure is illustrated in United States Pat. No. 3,310,197 to Folmsbee, et al., while an example of the latter type is disclosed in United States Pat. No. 1,047,517 to Harris.

The present invention overcomes these difficulties of the prior art devices, and provides a safety vent structure which is both simple and inexpensive, and in which the frangible element may be exposed for inspection or replacement simply by loosening one fastening device. In accordance with the present invention, there is provided a main body member defining a chamber with first and second openings. Associated with the first opening is a seat member for receiving the frangible element in closing relationship to the first opening. A retainer member, which may be provided with a weather cover, serves to hold the frangible element against the seat. Both the retainer and the seat have beveled projections around the outer peripheries thereof for coacting with bearing surfaces on an ordinary coupling clamp. As a single threaded element on the coupling clamp is tightened, the bearing surfaces press against the beveled projections and force the retainer and seat toward one another, thus securely holding the frangible element.

The second opening to the chamber communicates with the interior of the vessel through a third opening in the vessel wall. In a preferred form of the invention, a portion of the body itself extends through the third opening into the vessel, so that the second opening is positioned within the interior of the vessel. In another form of the invention, the body is secured directly to the outer surface of the vessel, so that the second opening surrounds the third opening. Preferably, either the second or third openings has a sectional area which is less than the sectional area of the chamber, thus retarding transient pressure buildup within the chamber, as disclosed in copending applications, Ser. Nos. 643,238 and 643,283, now U.S. Pat. No. 3,435,984, both assigned to the assignee of the present application.

A safety vent structure constructed in accordance with the present invention is quite inexpensive to fabricate and install. It employs a minimum of easily fabricated parts, and can be used with readily available standard coupling clamps. Due to the unique design of the present safety vent structure, frangible elements can be inspected or replaced quickly and easily, even when, as is often the case, the safety vent is positioned in a comparatively inaccessible location on a railway tank car. The need for only one fastening device reduces the difficulties arising from the dropping of nuts or bolts during inspection or replacement. Moreover, the present safety vent structure is admirably suited for installation on existing tank cars, and such installation may be accomplished without disturbing the integrity of existing linings in such cars.

The foregoing objects and features of the invention will be more fully appreciated in light of the following detailed description, with illustrative reference to the drawings, in which:

FIG. 1 is a sectional elevation of an exemplary safety vent structure constructed in accordance with the invention and associated with a portion of a tank car;

FIG. 2 is a sectional plan view of the exemplary safety vent structure, taken on the line 2—2 of FIG. 1; and FIG. 3 is a partial sectional elevation of a modified form of safety vent structure, showing a different association with the tank car.

DESCRIPTION OF EXEMPLARY EMBODIMENT

Referring specifically to FIGS. 1 and 2, there is illustrated an exemplary safety vent structure 10 constructed in accordance with the present invention. The safety vent structure 10 includes an elongated cylindrical body 12 defining an interior chamber 14. The body includes first and second end portions 16 and 18, respectively. As shown in FIG. 1, the body 12 is mounted on a cover 20 on a nozzle 22 attached to a railway tank car. The body 12 extends through a third opening 21 in the cover 20, so that the second end portion 18 is positioned within the confines of the nozzle 22 or the tank car itself. It should be understood however, that the body 12 could be mounted in association with other structures, such as domes or manways, or could be mounted directly in association with a portion of the main tank wall. Moreover, the safety vent structure 10 could be used in connection with any type of vessel, and is not intended to be limited to the environmental context of a railway tank car.

The body 12, although depicted as cylindrical, could actually be of any convenient shape or configuration, provided that it serves to define a chamber 14 having first and second openings 24 and 26 respectively. It will be noted in FIG. 1 that the upper opening 24 is defined by the upper end portion 16 of the body 12. In similar fashion, the lower end portion 18, which as depicted constitutes a generally hemispherical member, defines the somewhat smaller aperture or opening 26.

As disclosed in copending applications, Ser. Nos. 643,238 and 643,283, the second opening 26 may have a sectional area which is less than that of the chamber 14. This feature results in a reduced rate of pressure buildup within the chamber 14 from that experienced within the nozzle 22. Accordingly, the effects of transient over-pressures within the tank car are reduced, and the safety vent structure 10 operates to relieve the pressure within the tank only when a steady over-pressure is experienced.

FIG. 3 illustrates a slightly modified form of the invention, in which a modified second end portion 18a of the body 12 is directly attached to a tank wall 28 so that the second opening 26a surrounds a third opening 21a in the tank wall. It can be seen in this instance that the third opening 21a is of substantially lesser cross sectional area than the cross sectional area of the chamber 14, again resulting in retarded pressure buildup within chamber 14.

Turning again to FIG. 1, the upper end portion 16 of the body 12 has associated therewith an annular seat member 30 which provides a seating surface for a frangible element or disc 32. As can be seen, the frangible element 32 is positioned in closing relationship to the first opening 24 leading into the chamber 14. Mounted atop the frangible element 32 is an annular retainer 34 which serves to retain the frangible element securely in place against the seat member 30. The retainer 34 includes a cover portion 36 which is constructed with passageways 38 so that the upper surface of the frangible element 32 is in fluid communication with the atmosphere.

Each of the seat 30 and retainer 34 includes a beveled projection 40 and 42 respectively, around the outer periphery thereof. Associated with these beveled projections 40 and 42 is a coupling clamp 44 which includes angled bearing surfaces 46 on the interior thereof. The bearing surfaces 46 coact with the beveled projections 40 and 42 so as to urge the retainer 34 forcibly toward the seat 30 when the clamp 44 is tightened.

As best seen in FIG. 2, the clamp 44 comprises an outer strap 48 to which is attached inner members 50 defining the bearing surfaces 46. One end portion 52 of the strap 48 is connected by means of a pin 54 to a connector member 56. The connector member 56 also has pivotally attached thereto a tension bolt 58 which is threaded at its free end 58a. A second end portion 60 of the strap 48 is connected to a pin 62 attached to a thrust sleeve 64. The thrust sleeve 64 fits slideably over the tension bolt 58, and is held in place thereon by a nut 66.

When the nut 66 is tightened, the thrust sleeve 64 and the connector member 56 are drawn toward one another, thus tending to draw together the first and second ends 52 and 60 of the strap 48. This force in turn causes the bearing surfaces 46 on the interior of the strap 48 to assert wedging forces upon the beveled projections 40 and 42. In this manner, as the nut 66 on the clamp 44 is tightened, the seat 30 and retainer 34 are drawn tightly together, thus securing the frangible element 32.

As will be apparent to those skilled in the art, the frangible element 32 will rupture and vent the chamber 14 to atmosphere whenever the pressure within the chamber exceeds the predetermined maximum for which the frangible element is designed. The frangible element 32 may be exposed for inspection or replacement simply by loosening the nut 66 from the tension 58 to the point where the bearing surfaces 46 clear the beveled projections 40 and 42, so that the retainer 34 may be lifted off the frangible element.

Coupling clamps 44 of the type illustrated are presently available, and can be used as a part of the safety vent structure 10 without modification or adaptation. As will be apparent to those familiar with the art, the subject safety vent structure 10 can be inexpensively constructed and installed either as original equipment, or upon existing tank cars.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention.

I claim:

1. A safety vent structure for a vessel comprising: a body defining a chamber, said body having first and second end portions respectively defining first and second openings into said chamber, said body being mounted in association with said vessel so that said second opening permits fluid communication between said chamber and the interior of said vessel; an annular seat associated with said first end portion adjacent said first opening, said seat having a beveled projection around the outer periphery thereof, said seat further having a flat recess therein defining an upwardly extending vertical flange about the outer periphery thereof; a frangible element mounted in said recess of said seat in closing relationship to said first opening; an annular retainer for holding said frangible element in fluid-tight association with said seat, said retainer having a beveled projection around the outer periphery thereof; and a coupling clamp closely fitting around the outer peripheries of said retainer and said seat so as not to permit clamping when said frangible element rests upon a portion of said vertical flange, said clamp comprising a strap in the form of an incomplete circle having free ends, a bolt attached to one of said free ends, a sleeve attached to said other free end and adapted for travel on said bolt, and a nut for urging said sleeve along said bolt to force said free ends toward one another, said strap having interior bearing surfaces for coacting with said beveled projections and urging said seat and said retainer together as said clamp is tightened.

2. A safety vent structure in accordance with claim 1, wherein said body is hermetically mounted in an aperture in a cover for a nozzle.

3. A safety vent structure in accordance with claim 2, wherein the sectional area of said second opening is less than the sectional area of said chamber.

4. A safety vent structure in accordance with claim 1, wherein said second end portion of said body is hermetically mounted on an exterior wall of said vessel, so that said second opening surrounds an unbaffled aperture in said wall.

5. A safety vent structure in accordance with claim 4, wherein the sectional area of said aperture is less than the sectional area of said chamber.

6. A safety vent structure in accordance with claim 1, wherein said retainer includes an integral weather cover vented on its underside.

References Cited
UNITED STATES PATENTS

| | | | |
|---|---|---|---|
| 1,047,517 | 12/1912 | Harris | 220—44 |
| 1,205,443 | 11/1916 | Elkins. | |
| 2,751,123 | 6/1956 | Kuhles et al. | 220—55 |
| 3,043,465 | 7/1962 | Horner. | |
| 3,310,197 | 3/1967 | Folmsbee et al. | |

RAPHAEL H. SCHWARTZ, Primary Examiner

U.S. Cl. X.R.

220—55